United States Patent [19]
Young

[11] 3,950,131
[45] Apr. 13, 1976

[54] CONTINUOUS METHOD FOR RECLAIMING CHROMIUM HYDROXIDE FROM SPENT CHROME TANNING LIQUORS AND RE-USE THEREOF IN SUBSEQUENT TANNING

[75] Inventor: Harland H. Young, Western Springs, Ill.

[73] Assignee: Hoffmann-Stafford Tanning Co., Chicago, Ill.

[22] Filed: June 20, 1973

[21] Appl. No.: 371,595

[52] U.S. Cl. ...................... 8/94.27; 8/94.2; 210/70; 210/73 S; 252/8.57; 423/55; 423/607
[51] Int. Cl.$^2$...................... C14C 3/06; C01G 37/02
[58] Field of Search ........... 8/94.2, 94.27; 252/8.57; 423/607, 55; 210/70, 73, 225, 331

[56] References Cited

OTHER PUBLICATIONS

Hauck, Journal of the American Leather Chemists Association, Vol. 57, Oct. 1972, pp. 422–429.

Harnly, Journal of the American Leather Chemists Association, Vol. 46, 1951, pp. 170 and 171.

*Primary Examiner*—Herbert B. Guynn
*Attorney, Agent, or Firm*—Wolfe, Hubbard, Leydig, Voit & Osann, Ltd.

[57] ABSTRACT

A continuous method is provided for reclaiming chromium compounds which heretofore were discharged as industrial waste from chrome liquor tanneries. The method includes continuous agitation of chrome sludge along with continuous filtration and movement through successive filtering zones. This method is both economically attractive and vital from an ecological standpoint. The reclaimed chromium values are in condition for reconstitution into fresh chrome-tanning liquors.

4 Claims, 2 Drawing Figures

Figure 1:
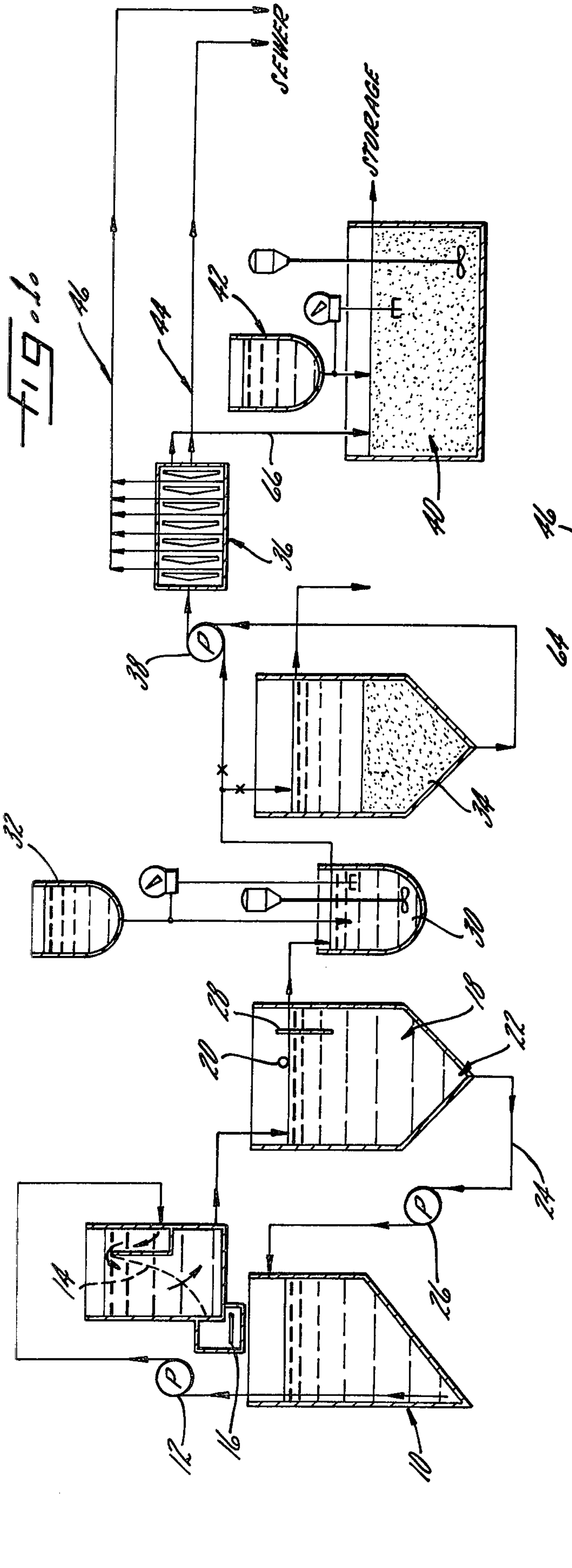

CONTINUOUS METHOD FOR RECLAIMING CHROMIUM HYDROXIDE FROM SPENT CHROME TANNING LIQUORS AND RE-USE THEREOF IN SUBSEQUENT TANNING

BACKGROUND AND OBJECTS OF THE INVENTION

Over a period of many years, a number of methods have been suggested whereby chromium compounds could be recovered and reformulated for tanning purposes. Each of these procedures, however, involved a great many individual steps supplemented by constant chemical analyses in order to insure uniform composition in the chemical tanning solutions. In fact, so complicated did these procedures become that their costs were excessive when compared with the use of fresh chemicals. This led to their very brief use during war times or other periods when the shortage of chromium compounds became critical.

At the present time, with no shortage of chromium, there has arisen a new obstacle to the discarding of spent or excess chromium liquors. This is the objection to certain heavy metals in industrial effluents because of the untoward effect they exert upon subsequent waste treatment processes.

The loss of soluble chromium compounds in tannery effluents has gradually increased over a period of years because it was cheaper to buy fresh supplies of chrome salts than to incur the expense of chrome recovery. Another factor contributing to this discharge of chromium salts was the desire to speed up the tanning process by forcing penetration of chromium salts by using higher concentrations of chromium salts. This results in an increased tanning rate with commensurate economics in equipment cycling and labor per unit of production. At the same time, however, it increases the amount of chromium discharged in the tannery effluent as well as the percentage of chromium lost from the leather making process.

From a number of surveys made for various tanneries, it has been found that the most efficient tanneries use about two-thirds of the total chromium purchased and discard one-third in their plant effluent. Less efficiently managed tanneries may discard up to one-half of the chromium purchased.

All tannery waste generated by washing, soaking, dehairing, bating, pickling, chrome tanning, dyeing, fat-liquoring, and finishing combines to form an effluent that is predominantly alkaline and contains the waste chromium in its precipitated hydroxide or metal chromite form. This can be settled by conventional catch basin systems resulting in the production of sludge containing not only chromium compounds but grit, manure, grease, and other suspended or settleable solids. However, the collection of sludge for disposal entails a great deal of expense.

If the chromium is diverted from the total plant effluent, then the volume of sludge to be disposed of is significantly reduced.

Over a period of many years, it has been conventional to manufacture leather by processing hides and skins through a series of steps some of which make use of different machinery and equipment (e.g. paddle vats and drums). Many tanneries are very old and sewer lines have not been laid to segregate the various waste streams. In addition, the hides in process may be moved over a considerable area and the chemical wastes may be widely scattered by draining. As dumped from tanning drums, the chrome tanned "blue stock" lands in a pile with the spent chrome liquors following the floor slopes to the drains and sewers. When the blue stock is piled for draining, it is frequently moved into other plant areas and excess chrome finds its way into other drains. Therefore, it is obvious that segregation of chrome liquors is almost impossible in many plants.

More recently, a major change in tannery equipment has been introduced in the form of a modified cement mixer with a ribbon flight to retain or remove stock at will. Additional features of the new processing equipment permits the recirculation of chemical solutions and their removal by pumping out to any designated location rather than to discharge them over a large floor area. Even as the completely tanned leather is ejected from the processor, the spent chrome liquor is easily confined to an area for recovery. Subsequent steps such as conveying to wringers are channeled over areas where drains convey all chrome containing liquors into one collection point.

There is no contamination of the spent chrome liquor because all other chemicals from washing, soaking, dehairing, bating, and washing are pumped out into the main sewers for handling in conventional waste treatment facilities without contamination by the chrome. By the same token, none of these chemicals can find their way into the segregated spent chrome liquor.

Many procedures have been tried whereby chromium compounds were processed for recycling. These have been amply reviewed in the Journal of the American Leather Chemists Association 67, 422–429 (1972) but are briefly described as follows:

1. Spent chrome liquor may be analyzed and brought up to original strength by the refortification. This requires exhaustive chemical analyses because the tanning liquors penetrate the stock at very low pH values and after penetration are "fixed" by neutralization to higher pH values. This results in a build-up of soluble salts so that a certain amount of the chrome liquor must be discarded each day to avoid this difficulty.

One of the ever present difficulties is to avoid loss of chromium compounds to the sewer as the amount of spent chrome liquor is prone to increase as it is constantly reacidified and reneutralized.

2. A modification of the above has been suggested which involves the use of spent chrome tan liquors along with the pickle step and proper adjustment of salts to retard swelling. To be sure, the spent chrome liquor can be exhausted in this way but only by extending the length of the pickling step to allow time for the chrome to be picked up by the hide material. Another problem that can occur is the premature precipitation of chromium as it penetrates the alkaline stock without sufficient advance pickling. This results in the formation of an impervious barrier which defeats the whole process. If one wishes to extend the tanning cycle by several hours then this procedure can be used. Of course, complete exhaustion of chrome liquors has been found to be unobtainable in a practical way.

3. Spent chrome liquor can also be used as the solvent for preparing sodium dichromate solutions prior to acidulation and reduction with glucose. However, here again, a constant check by chemical analyses must be rigidly maintained.

4. Precipitation of the chromium from spent chrome liquors as the hydroxide followed by filtration to remove soluble salts and proteins and final solution in sulfuric acid to the desired basicity has been found to be the only suitable procedure. This was used during World War II when a chromium shortage existed. Still required were constant chemical analyses and the ever present difficulty of filtering a flocculant thixotropic precipitate of variable composition. This procedure could be made to work but offered no economy under ordinary market conditions.

5. A modification of the above has also been tried. This includes the precipitation of chromium hydroxide from the spent liquors, allowing it to settle, decanting the clear supernatant salt solutions thereby reducing the total volume, redissolving the chromium hydroxide in sulfuric acid and fortifying with fresh chrome compounds to the desired composition and volume of solution. Here again, exhaustive analyses are necessary because flocculent chromium hydroxide rarely settles at the same rate and the precipitate as drawn off varies widely in concentration.

In every chrome recovery method, it is obvious that the spent chrome liquor must be screened and skimmed to remove most of the proteinaceous strings, flesh, and floatable fatty material.

It is, therefore, an object of this invention to provide a continuous and automatic method for the recovery and re-use of substantially all chromium from once-used spent chrome liquors. It is a further object of this invention to eliminate from chrome tannery effluents all chromium down to limits of one part per million. Still another object of the invention is to provide an automatically controlled continuous supply of recovered chromium tanning salts having a constant composition and requiring no batch analyses for determination of composition or concentration.

A further object of the invention is to provide a means for recovering approximately one-third of all the chrome tanning compounds used thereby effecting an economy of approximately 10 to 15 cents for every hide tanned.

Additional objects if not specifically set forth herein, will be readily apparent to those skilled in the art of chrome-tanning hides and skins.

SUMMARY AND DETAILED DESCRIPTION OF THE INVENTION

In the practice of this invention, use is made of a new method which makes possible a totally automatic and continuous procedure for economically recovering and re-using chromium compounds in making leather. It eliminates the need for constant chemical analyses and permits integration into a computerized automated system. In addition to these economic advantages the new method virtually eliminates the discharge of chrome into the sewer water; — a distinct environmental advance.

In its broadest sense this invention comprises a process or method for the recovery of chrome values from spent chrome tanning liquors which comprises:

a. collecting spent chrome containing liquors;

b. removing particulate matter;

c. adding an alkaline reacting substance in amount sufficient to raise the pH of the chrome liquor to at least pH 8.0, thereby forming a thixotropic suspension of precipitated chromium hydroxide;

d. depositing a first layer of said thixotropic suspension on a first segment of a multisegment continuous pressure filter, filtering off a portion of aqueous liquid from said suspension while continuously agitating and moving said first layer to a second segment of said filter;

e. continuously agitating and moving said layer past said second segment while filtering off a portion of aqueous liquid therefrom and increasing the concentration of chromium hydroxide in said layer;

f. subjecting the more concentrated thixotropic suspension of chromium hydroxide to successive filter segments with continuous agitation and application of pressure to filter off portions of aqueous liquid until said suspension reaches a predetermined concentration of chromium hydroxide;

g. discharging the said concentrated suspension from said continuous filter, and adding an amount of acid reacting substance sufficient to dissolve said suspension and form a solution having a predetermined $Cr_2O_3$ equivalent value;

h. and reusing said $Cr_2O_3$ in a subsequent chrome tanning operation.

In more detailed and specific sense this invention includes the steps of:

a. introducing a chromium hydroxide suspension continuously into a multisegment continuous pressure filter at a pressure above atmospheric and preferably in excess of about 80 psi;

b. maintaining and adjusting the filter cake to a constant thickness on the filtering surfaces;

c. continuously agitating the filter cake while propelling the cake through successive filtering segments and continuously withdrawing fillrate to form a filter cake of increasing concentration;

d. and discharging filter cake at a substantially constant concentration.

The following detailed description of the invention and the accompanying drawing is provided for the purpose of teaching the practice thereof. It is not intended to be a limitation on the invention in any way, the scope being determined by the appended claims.

At the conclusion of the chrome tanning step and neutralization, if necessary, the spent chrome liquor is drained or pumped to a sump which receives, as well, all spent chrome liquor that drains to the sump from other draining, conveying or storage areas. This concentration of spent chrome liquor into one sump or tank can be achieved whether the liquor is removed from a tanning drum or cement mixer type hide processor. Drainage from curbed floor areas is suitable if the liquor is dumped but it is preferred that the spent liquor be pumped from the drum or mixer in order to minimize contamination. Floor drainage is necessary, however, from all areas where the chrome-tanned stock drains or drips spent liquor by wringing or standing.

The spent chrome liquor is pumped from the accumulation sump or tank to a suitable screening device for the removal of particles of hide pieces, strings, flesh or other debris that would interfere with subsequent treatment. Almost any fine screening device is suitable but the continuous self-cleaning screen known as the Bauer Hydrasieve is preferred. A second advantage is the aeration that is effected by the screening which facilitates the separation of fat by floatation.

The screened effluent then falls into a relatively small clarifier which permits substantially all the fat and grease to surface for removal and any flocculated solids to settle and return to the sump for rescreening.

In most tanneries the spent chrome liquor is adjusted to a definite pH of 3.5–4.0 in order to fix the chrome to the hide substance. This is done prior to dumping the spent chrome. Although each tannery may adjust to a somewhat different pH for chrome fixation, this pH is usually constant for each tannery.

The degreased and screened liquor containing the spent chrome salts in solution is then drawn off into a precipitation zone where alkali is continuously added until the pH is no less than 8.0 and no greater than 9.5. Within this range of pH, the chromium hydroxide precipitates quantitatively even in the presence of chlorides, sulfates, and formates of sodium and calcium which latter remain in solution. This alkalization can be achieved continuously and automatically by using automatic pH control devices such as are manufactured by Leeds & Northrup, Minneapolis-Honeywell or other qualified companies. It is frequently possible to introduce the precipitating alkali solution at a rate and concentration which is proportional to the flow of spent chrome liquor and still achieve the desired pH range of 8–9.5 without resorting to the expensive automatic pH control devices. For example, ammonia can be used in moderate excess as can sodium bi- or sesquicarbonates without exceeding the pH of 9.5. The important thing is to precipitate the chromium hydroxide while retaining other ions in solution so that they cannot build up during the program of recovery and re-use. It is apparent that any alkaline reacting material can be used but the use of sodium hydroxide or ammonium hydroxide is preferred because substantially all ions and salts present, except the chromium, remain in solution and are subsequently separated from the precipitated chromium hydroxide.

The turquoise blue suspension of precipitated chromium hydroxide is conveyed from the neutralization or alkalization zone into a holding tank where the precipitated chromium hydroxide tends to flocculate and settle leaving a supernatant clear solution of the soluble salts. This holding tank is usually of sufficient size to retain the precipitated chromium hydroxide for from three to five hours during which time about one-third of the total volume can be decanted as clear supernatant salt solutions containing less than five ppm of chromium metal equivalent. Simultaneously, the chromium hydroxide sludge settles and awaits transfer to the filtering stage. The rate of settling of the chromium hydroxide varies widely depending upon the physical properties of the precipitate, temperature, concentration, and presence of peptizing agents. For example, if the concentration of chromium ion in the spent chrome liquor is high, then the volume of precipitate is sufficiently great to effect an increase in viscosity and thixotropicity and decrease in settling rate. It will be apparent that the concentration of precipitated chromium hydroxide in the sludge fed to the filter will vary over wide ranges depending upon the variables discussed above and conventional filter methods will be found to be unsuitable for continuous and automatic operation. It is recognized in the art that filtration of a thixotropic suspension of chromium hydroxide is among the most difficult of procedures.

For example: vacuum filtration has been used but pressure differential is limited to fifteen pounds per square inch and it is impossible to remove a filter cake of constant composition. Conventional pressure filter methods employing plate and frame type filters have been used but result in filter cake of variable composition. Both conventional vacuum and pressure filter methods fail to handle fine flocculent thixotropic precipitates without being tremendously oversized. This is due to the sharp decrease in filtration rate as the filter cake builds up in thickness so that the resultant concentrated filter cake is of non-uniform composition.

The chromium hydroxide precipitated in the holding and settling tank is drawn from the bottom of the tank while the clear supernatant liquor is decanted to the sewer.

The precipitate (flocculent suspension) is introduced into a continuous filter at a positive pressure preferably in excess of 80 psi. The filter cake is maintained at a constant thickness during the continuous filtration. The filter cake is continuously agitated and propelled through multiple filtration zones in the filter. The concentrated paste is retained within the filtration zones until the concentration reaches a predetermined level. The concentrated filter cake in paste form is intermittently discharged from the last stage of the filter under sufficient pressure to propel the concentrated chromium hydroxide to the re-solution area.

One such continuous pressure filter is the Dyno-Filter sold by Willy Bachhofen of Switzerland. Another is the Artisan Thin Film Continuous Pressure Filter sold by Artisan Industries, Inc. of Waltham, Massachusetts.

As ejected continuously from the filter, the chromium hydroxide of predetermined concentration, preferably about 14–15% chromium hydroxide, is propelled at a uniform rate to an acid mixing zone where it is mixed continuously with a proportionate quantity of 66° Be sulfuric acid to produce the desired basicity for re-use in tanning. The recovered chrome solution adjusted to the desired basicity is then added to the pickle stock along with additional fresh chrome tanning material to bring the concentration to the desired level for complete tannage. Usually this recovery method will produce about one-third the amount of chrome required by the tanning and will be supplemented with two-thirds fresh chrome.

The amount of chromium in spent tanning liquor will vary widely among tanneries but can be held relatively constant for any given tannery with adequate process control. Spent chrome liquor normally will contain from 0.2–1.0% chromium metal equivalent.

Figure 2:
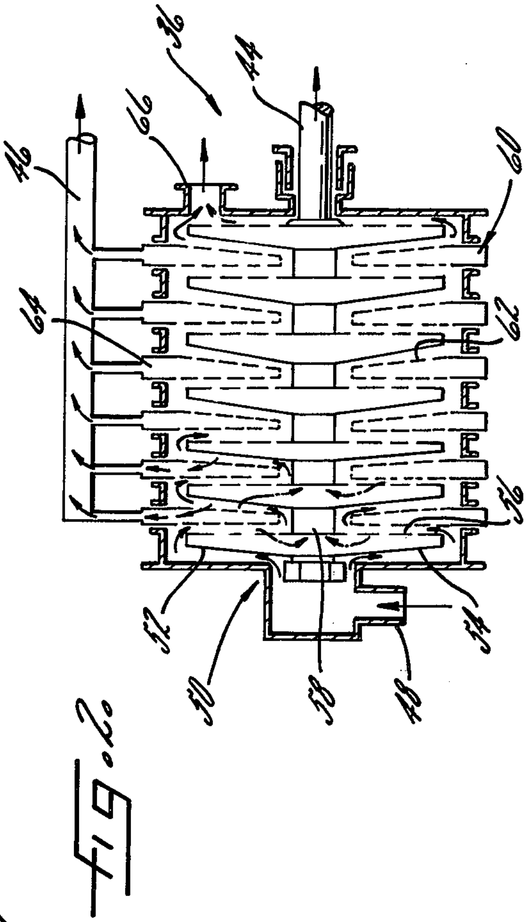

In order to facilitate the description of my process, there is made a part of this application, FIG. 1, a schematic flow sheet drawing of the process as carried out on a commercial scale, and FIG. 2, an enlarged view of the filter as depicted in the flow sheet drawing of FIG. 1.

In the drawing, 10 is the sump or well into which all spent chrome liquor is conveyed as collected in various parts of the plant. It is pumped by pump 12 over the Hydrasieve 14 (a cascade sieve screen), screenings (solids) being caught on an endless belt conveyor 16 for discharge into a receptacle (not shown). The screened liquor flows into a separator 18 where fat and grease accumulate at the surface, eventually overflowing through port 20. Any sediment sinks to the cone bottom 22 and is drawn off through line 24 by pump 26 and returned to sump 10 for rescreening. The intermediate layer of clear spent chrome liquor in tank 18 exits under the baffle 28 into a mixing tank 30 where liquid caustic soda or other suitable alkali solution is introduced from feeder 32 to adjust the pH in tank 30 to the range of 8.0–9.5. If the concentration of precipitated chromium hydroxide is high enough to preclude settling in the clarifier 34, it by-passes directly to the continuous pressure filter 36. But, if the suspension of chromium hydroxide is sufficiently dilute to permit settling, it is detained in the clarifier 34 so as to permit the precipitate to collect in the cone bottom. Simultaneously, clear supernatant salt solution is decanted from the clarifier at predetermined levels by a simple decanting line (not shown), thereby reducing to a minimum the volume of chromium hydroxide suspension which must be filtered. In either case, the suspension is pumped under pressure by pump 38 into the continuous filter 36 where the filter cake is maintained at a constant thickness and the chromium hydroxide is concentrated to a predetermined concentration. At this desired concentration (14–15 percent), the concentrated paste of chromium hydroxide is ejected into holding tank 40 where a proportionate quantity of sulfuric acid from feeder 42 is mixed in until the desired basicity is achieved and the precipitate has been redissolved. The clear filtrate is conveyed through lines 44 and 46 to the plant sewers, having less than two ppm of total chromium equivalent.

FIG. 2, as pointed out above, is an enlarged view of the filter 36 as depicted in the flow diagram FIG. 1. As shown in FIG. 2 this embodiment of a multisegment continuous pressure filter has an inlet port 48 feeding into a housing 50. Within the housing is a series of rotary filter plates 52 comprised of a metal disk 54 adapted to have a filter surface 56. Liquid passes through the filter 56 and out through a collector pipe 58. Stationary plates 60 are held within the filter housing and consist of circular hollow frames having filter surfaces 62 through which filtrate flows and is withdrawn through collector lines 64. Filtrate passes through discharge lines 44 and 46 to the sewer. Filter cake ejects from the line 66 which may have a pressure actuated valve (not shown) to eject only when pressure has built up to a desired level.

The final solution of recovered chrome now ready for re-use will normally contain about 10% as $Cr_2O_3$ equivalent and will retain approximately 10 percent of the soluble salts originally present in the spent chrome liquor. In other words 90 percent of the soluble salts will have been discharged in the substantially chromium-free filtrate. The filter method should be adjusted so as to provide a substantially constant concentration of chromium hydroxide in the ejected paste or cake. It is preferred that the chromium hydroxide concentration of the filter cake (paste) be maintained between ten and fifteen percent as it enters the acidification zone. In this range, the paste is sufficiently mobile to be pumped or propelled and can be readily blended with sulfuric acid with normal agitation. In smaller concentration the volumes become uneconomical to handle while at higher concentrations (above about 15 percent) the paste becomes too thick for ease of handling.

In addition to the actual basic chromic sulfate used to effect tanning, there is present sulfates, chlorides, and formates of sodium and calcium. Also, there is present a complex mixture of hydroxy organic acids formed by the original reduction of sodium dichromate to chromic sulfate by sugars and sulfuric acid. These complex acids from the oxidation of the sugar are also valuable masking agents and remain along with all the other salts in the spent chrome liquor.

The following examples, representing actual recovery practices, are intended as illustrations of the chrome recovery and re-use procedure. They are in no way limitative, the appended claims serving to determine the scope of the invention.

EXAMPLE I 5,600 lbs. of spent chrome liquor containing 0.48% chromium as metal were screened to remove flesh strings, and particulate matter and skimmed to remove fat and grease floating on the surface of the liquor. The clear liquor was treated with 50% liquid caustic soda solution with continuous agitation until a pH of 8.6 was attained after the addition of 201 lbs. of liquid caustic. The suspension of precipitated chromium hydroxide was settled for a period of three hours and approximately 1,200 lbs. of clear supernatant solution was decanted to the sewer while 4,400 lbs. of suspended chromium hydroxide was pumped through the filter (Artisan Thin Film Continuous Pressure Filter). The clear filtrate was analyzed and found to contain 1.9 ppm of chromium as metal in the composite sample taken throughout the run. The volume of filtrate was 3,800 lbs. and when added to the 1,200 lbs. of decantate accounted for 90 percent of the total feed stock. Simultaneously with the discharge of the clear filtrate, there was obtained 553 lbs. of chromium hydroxide paste containing 15% of chromium hydroxide or 83 lbs. Neutralization by mixing with 66° Be sulfuric acid required 53 lbs. of acid, approximately equivalent to the caustic alkali used to effect precipitation of the chromium in an earlier step. The final recovered and acidified chrome now totaled 606 lbs. having a pH of 2.3 and a $Cr_2O_3$ equivalent of 10.2 percent as compared with the original high strength chrome tan solution of 17.5% $Cr_2O_3$. In contained also about 8% sodium chloride and 1% sodium formate along with a small amount of soluble sulfates resulting from the bicarbonate neutralization, from leaching of calcium salts during the tanning cycle, plus some sulfates resulting from the original reduction of sodium dichromate. More simply then, the recovered chrome paste contained approximately one-third of the original chrome compound and one-tenth of the soluble salts used in the tanning cycle.

Example I was continued by tanning matched sides of bated and washed white stock; one-half being tanned with 100% fresh chrome and the other half being tanned with a mixture of one-third recovered chrome (per the previously described recovery process) and two-thirds fresh chrome. Two hundred hides already dehaired, limed, bated, and washed were divided by cutting them down to the backbone line. Each lot of 200 sides corresponding to a soaked hide weight of 5,000 lbs., was processed through the pickle and tan cycle in a concrete mixer type hide processor.

Sides Tanned with All Fresh Chrome

Two hundred sides washed after bating were covered with 380 gallons of water and rotated while adding 400 lbs. sodium chloride and 50 lbs. of sodium formate followed by 100 lbs. of 66°Be sulfuric acid previously diluted with 100 gallons of water. While rotating the processor at 12 rpm, the solution was recirculated for 15 minutes and then left to rotate at 12 rpm for two hours. At this point, the pickling stage was complete. Six hundred twenty-five pounds of fresh chrome containing 17 ½% $Cr_2O_3$ equivalent was added to the rotating mixer and after recirculating the solution for 15 minutes, the mixer was rotated at 12 rpm for 3 ½ hours. At this point, chrome penetration was complete and the temperature had been raised to 130°F by warming the recirculated solution. The chromium tanning was completed or "fixed" by adjusting the pH up to 3.8 by three additions of a sodium bicarbonate solution made by dissolving or suspending 70 lbs. $NaHCO_3$ in forty gallons of water. Multiple additions were necessary to avoid excessive frothing due to carbon dioxide evolution. After 1 ½ hours, the spent chrome liquor was pumped out of the mixer and found to contain 0.42% as chromium metal equivalent. The chrome tanned leather (blue stock), after wringing, contained 3.61% $Cr_2O_3$ on a moisture free basis.

Sides Tanned with Two-Thirds Fresh Chrome and One-Third Recovered Chrome

The remainder of two hundred matched sides were placed in the mixer as with fresh chrome and were pickled the same way but using only 90 percent of the sodium chloride (360 lbs.) and 90 percent of the sodium formate (45 lbs.). Since the recovered chrome solution was more dilute than the fresh chrome, less water was introduced as follows:

To the 200 matched sides after bating, washing, and draining, there was added 345 gallons of water, 360 lbs. sodium chloride and 45 pounds of sodium formate. This was followed by the normal amount of sulfuric acid, namely, 100 lbs. previously dissolved in 100 gallons of water. Recirculation was carried out for fifteen minutes and rotation of the mixer at 12 rpm was continued for two hours as before. There was then added 358 lbs. of the recovered chrome solution (33 gals.) containing 10.2% $Cr_2O_3$ equivalent followed immediately by 417 lbs. of fresh chrome containing 17 ½% $Cr_2O_3$ equivalent. The remainder of the tanning and fixation process was exactly the same as for the run using all fresh chrome.

The spent chrome liquor from this run contained 0.40 percent as chromium metal equivalent and the "blue stock" after wringing was found to contain 3.64% $Cr_2O_3$ on a moisture free basis.

As matched sides of these two runs were compared critically after completion of the processing to finished leather, there was no discernible difference between the two in tensile strength, tear strength, bursting strength, or appearance.

EXAMPLE II

This test was run exactly as Example I except that the recovered chrome was obtained from the spent chrome from Example I. It too employed one-third recovered chrome and two-thirds fresh chrome with sodium chloride and sodium formate being used at the 90 percent level. Here again, the spent chrome liquor contained 0.48% chromium as metal equivalent and the finished blue stock contained 3.59% $Cr_2O_3$ on a moisture-free basis. The finished hides were satisfactory in physical properties and appearance.

EXAMPLE III

This example was run as in Example I using the spent chrome liquor from Example II supplemented with additional spent chrome liquor from other tanning drums. The spent chrome mixture contained 0.55% chromium as metal equivalent and when precipitated with 2 of 50% liquid caustic produced a suspension that settled only 20 percent in three hours. This was decanted and the remainder was put through the continuous filter. The filtrate contained 0.5 ppm of chromium metal equivalent and was discarded. The chromium hydroxide paste contained 14% chromium hydroxide and when dissolved in 10 percent of its weight of 66°Be sulfuric acid yielded a recovered chromium solution containing 10% $Cr_2O_3$.

This was used as in Example I producing a spent chrome liquor containing 0.50% chromium as metal and a blue stock containing 3.67% $Cr_2O_3$ on a moisture-free basis. Again the finished hides were satisfactory in all respects.

EXAMPLE IV

A series of spent chrome liquors were processed by the chrome recovery method of this invention to determine the efficiency of chromium precipitation, the constancy of chromium level in the filtrate and the uniformity of chromium hydroxide concentration in the filtered concentrated paste. Also determined was the percent of supernatant liquor that could be decanted from the precipitate before filtration, and the normal variation in chromium concentration that might be expected as different spent chrome liquors were processed. Some of these liquors were obtained from tanning runs in which high concentrations of chrome were used. Others were obtained from test runs in which every effort was made to exhaust the chrome to as low a concentration as possible. Each sample of spent chrome liquor was screened to remove strings and flesh particles and skimmed to remove fat prior to the chrome recovery process. The results obtained are listed in the following TABLE I.

TABLE I

| Sample Spent Chrome Liquor | % Chromium Content | % NaOH Used Basis Chrome Liquor | pH after Complete Pptn | % Supernate decanted after 3 hours | Chromium present in filterate | Chromium Hydroxide in Concentrated Paste | % $H_2SO_4$ Added basis conc Paste | pH of redissolved Chromium Hydroxide | % $Cr_2O_3$ in recovered Chrome Liquor |
|---|---|---|---|---|---|---|---|---|---|
| 1 | 0.40 | 1.0 | 8.5 | 35 | 0.2 ppm | 14.6 | 9.5 | 2.3 | 10.0 |
| 2 | 0.32 | 1.2 | 9.0 | 40 | 0.8 " | 14.2 | 9.5 | 2.4 | 10.2 |
| 3 | 0.68 | 0.9 | 8.4 | 8 | 1.4 " | 15.0 | 9.5 | 2.2 | 10.3 |
| 4 | 0.70 | 1.1 | 8.9 | 10 | 0.6 " | 15.0 | 9.5 | 2.5 | 10.1 |
| 5 | 0.55 | 1.1 | 9.0 | 25 | 0.4 " | 14.7 | 9.5 | 2.5 | 10.4 |
| 6 | 0.22 | 1.0 | 8.8 | 50 | 1.1 " | 14.5 | 9.5 | 2.6 | 9.8 |
| 7 | 0.94 | 1.2 | 9.1 | 0 | 0.7 " | 14.6 | 9.5 | 2.5 | 10.1 |
| 8 | 0.82 | 1.1 | 9.0 | 5 | 1.0 " | 14.9 | 9.5 | 2.6 | 9.9 |
| 9 | 0.64 | 0.9 | 8.5 | 10 | 1.6 " | 15.0 | 9.5 | 2.4 | 10.0 |
| 10 | 0.71 | 1.3 | 9.2 | 10 | 0.9 " | 14.6 | 9.5 | 2.6 | 10.0 |
| 11 | 0.52 | 1.0 | 8.7 | 30 | 1.1 " | 15.0 | 9.5 | 2.3 | 9.7 |
| 12 | 0.57 | 1.1 | 8.8 | 20 | 1.2 " | 14.8 | 9.5 | 2.3 | 10.4 |
| 13 | 0.41 | 1.2 | 9.0 | 40 | 1.0 " | 14.7 | 9.5 | 2.4 | 10.3 |
| 14 | 0.48 | 1.2 | 9.1 | 30 | 0.9 " | 14.3 | 9.5 | 2.2 | 10.0 |

From the table, several generalizations can be observed:

1. Complete precipitation of the chromium occurs within the recommended pH range of 8.0–9.5.

2. The continuous filter method described herein resulted in a substantially consistent concentration of chromium hydroxide in the filter cake or paste in the range of 14.2–15.0 percent, whether or not the slurry was concentrated by settling and removal of supernate.

3. A constant amount of sulfuric acid; namely, 9.5 percent of the weight of chromium hydroxide produced an initial pH between 2.2–2.6 immediately after mixing and yielded a chrome solution ready for re-use that contained from 9.8–10.4% $Cr_2O_3$ equivalent.

Another form of continuous pressure filter (not shown) may be used in the same fashion as the filter shown in the drawings. This embodiment of the filter has a filtering zone comprising two adjacent porous plates and a rotor adapted to move between the plates and agitate the suspension as it is being forced against the filter surfaces to expell the aqueous liquid. The rotor is a substantially flat plate having a series of vanes attached thereto to assist in the agitation. Any desired number of filter zones may be arranged in series as shown in FIG. 2 and will be interconnected to allow movement of the suspension successively through them until filtration has been accomplished.

It is recognized that many modifications and variations of the chrome recovery process as hereinbefore set forth may be made without departing from the spirit and scope of this invention, and all such are intended to be included within the scope of the appended claims.

I claim as my invention:

1. The continuous process for recovery of chromium from spent chrome tanning liquors which comprises:

a. adding to spent chromium containing liquor an alkaline reacting substance in an amount sufficient to raise the pH of said liquor to at least about 8.0 and not greater than about 9.5, thereby forming a thixotropic suspension of precipitated chromium hydroxide;

b. depositing a layer of said suspension of uniform thickness on a first filter segment of a multisegment continuous pressure filter;

c. continuously agitating said layer while subjecting said layer to superatmospheric pressure, whereby aqueous liquid is expelled therefrom through said filter segment;

d. moving said filtered suspension under pressure to successive filter segments of said multisegment filter and simultaneously agitating said suspension;

e. repeating step (d) until said suspension reaches a predetermined substantially constant concentration of chromium hydroxide;

f. discharging said concentrated suspension to a mixing zone and adding thereto an amount of an acid reacting substance sufficient to substantially dissolve said suspension and convert it into a material suitable for tanning.

2. The continuous process for recovery of chromium from spent chrome tanning liquors which comprises:

a. adding to spent chromium containing liquor an alkaline reacting substance in an amount sufficient to raise the pH of said liquor to at least about 8.0 and not greater than about 9.5, thereby forming a thixotropic suspension of precipitated chromium hydroxide;

b. depositing a layer of said suspension of uniform thickness between two adjacent porous plates of a first filter segment of a multisegment continuous pressure filter;

c. continuously agitating said layer between said plates while subjecting said layer to superatmospheric pressure, whereby aqueous liquid is expelled therefrom through said filter segment;

d. moving said filtered suspension under pressure to successive filter segments of said multisegment filter and simultaneously agitating said suspension;

e. repeating step (d) until said suspension reaches a predetermined concentration of chromium hydroxide within the range of about 12.0 to 17.0 percent;

f. discharging said concentrated suspension to a mixing zone and adding thereto an amount of sulfuric acid sufficient to substantially dissolve said suspension.

3. In the continuous process for the recovery of chromium hydroxide from spent chrome tanning liquors by precipitating with soluble alkali at a pH of at least 8.0 and not greater than about 9.5, the steps which comprise a. in a first filtering zone depositing a layer of thixotropic chromium hydroxide suspension between two adjacent porous plates of a multiplate filter;

b. agitating the suspension between said plates to maintain it in flowable condition;

c. applying superatmospheric pressure to said suspension to expell at least a portion of aqueous liquid through said porous plates;

d. moving said partially filtered suspension to successive filtering zones and repeating steps (a), (b) and (c) above until said suspension reaches a predetermined substantially constant concentration of chromium hydroxide; and e. discharging said concentrate from said filter.

4. In the process for the recovery of chromium hydroxide from spent chrome tanning liquors by precipitating with soluble alkali at a pH of at least 8.0 and not greater than about 9.5 9.5, the steps which comprise a. in a first filtering zone depositing a layer of the thixotropic chromium hydroxide suspension between two adjacent porous plates of a multiplate filter;

b. rotating one of said plates to agitate said suspension;

c. applying superatmospheric pressure to said suspension to expell at least a portion of aqueous liquid through said porous plates;

d. moving said partially filtered suspension to a second filtering zone and again placing said suspension between two adjacent porous plates of said filter; and e. rotating one of said plates and applying superatmospheric pressure to said suspension to again expell at least a portion of aqueous liquid through said porous plates, thereby to achieve a suspension of substantially constant concentration of chromium hydroxide.

* * * * *